US010466921B1

(12) United States Patent
Martin et al.

(10) Patent No.: US 10,466,921 B1
(45) Date of Patent: Nov. 5, 2019

(54) ACCELERATING DATA REDUCTION THROUGH REINFORCEMENT LEARNING (71) Applicant: EMC IP Holding Company LLC, Hopkinton, MA (US)

(72) Inventors: Owen Martin, Hopedale, MA (US); Jeremy O'Hare, Westborough, MA (US); Alesia Tringale, Worcester, MA (US); Ken Dorman, West Brookfield, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/798,943

(22) Filed: Oct. 31, 2017

(51) Int. Cl.
  *G06F 3/03* (2006.01)
  *G06F 3/06* (2006.01)
  *G06F 13/12* (2006.01)

(52) U.S. Cl.
  CPC ............ *G06F 3/064* (2013.01); *G06F 3/0619* (2013.01); *G06F 13/122* (2013.01); *G06F 2003/0691* (2013.01)

(58) Field of Classification Search
  None
  See application file for complete search history.

(56) References Cited

U.S. PATENT DOCUMENTS

| 8,497,788 B1* | 7/2013 | Miller | H03M 7/30 341/51 |
| 9,048,862 B2* | 6/2015 | Condict | H03M 7/607 |

* cited by examiner

*Primary Examiner* — Cheng Yuan Tseng
(74) *Attorney, Agent, or Firm* — Muirhead and Saturnelli, LLC (57) ABSTRACT

Compressing data of a storage device includes selecting a portion of data for data compression that is predicted to be unlikely to be accessed, selecting a particular one of a plurality of data compression algorithms to apply to the portion according to a frequency value associated with each of the data compression algorithms, and adjusting the frequency value of the particular one of a plurality of data compression algorithms according to performance of the particular one of a plurality of data compression algorithms. The performance may vary according to a ratio of amount of compression achieved to processing cycles of a processor used to compress the portion of data. The processor may perform storage device functions that are separate from data compression. The portion of data may be selected from a plurality of logical devices used in connection with a single application that accesses the storage device.

20 Claims, 5 Drawing Sheets

ACCELERATING DATA REDUCTION THROUGH REINFORCEMENT LEARNING

TECHNICAL FIELD

This application relates to the field of computer systems and storage devices therefor and, more particularly, to the field of optimizing data compression for storage devices.

BACKGROUND OF THE INVENTION

Data array storage systems may include a plurality of host interface units (I/O modules), physical storage units (e.g., disk drives, SSD drives, etc.), and disk interface units (disk adapters) that are coupled to and used to control the storage units. Host systems coupled to the data array storage systems access data and provide control information through channels connected to the data array storage system. The host systems and applications thereon do not address the physical storage units of the data array storage system directly, but rather, access what appears to the host systems as a plurality of logical storage units. A particular one of the logical storage units may or may not correspond to any particular one of the physical storage units and, often, there is a more complex relationship between physical storage units and logical storage units.

It is known to compress data stored on data storage systems so that the actual storage space used is less than the uncompressed size of the data. However, there is usually a tradeoff between the amount of processing resources needed to apply compression algorithms to data and the amount of data compression that is realized. In many, but not all, cases, greater amounts of compression use greater amounts of processing resources. In addition, the frequency of data access plays a role since compressing data that is accessed relatively infrequently has less of an impact on processing resources of a storage system than compressing data that is accessed more frequently. Also, the specific contents of the data may make a difference; certain types of data compress more with less processing resources than other types of data. It is also sometimes the case that certain types of data achieve a better ratio of compression to processing resources used with particular compression algorithms than other types of data. Since the type of data as well as the frequency of data accesses may vary over time, it may not be possible to select a particular compression algorithm or set of algorithms that would be optimal over the entire life of a particular storage system.

Accordingly, it is desirable to be able to reliably vary data compression algorithm(s) used by a storage system in a way that optimizes a tradeoff between processing resources used and amount of compression performed even if the type of data and frequency of data accesses changes.

SUMMARY OF THE INVENTION

According to the system described herein, compressing data of a storage device includes selecting a portion of data for data compression that is predicted to be unlikely to be accessed, selecting a particular one of a plurality of data compression algorithms to apply to the portion according to a frequency value associated with each of the data compression algorithms, and adjusting the frequency value of the particular one of a plurality of data compression algorithms according to performance of the particular one of a plurality of data compression algorithms. The performance may vary according to a ratio of amount of compression achieved to processing cycles of a processor used to compress the portion of data. The processor may perform storage device functions that are separate from data compression. The portion of data may be selected from a plurality of logical devices used in connection with a single application that accesses the storage device. The portion may be selected based on the portion not having been previously compressed, the portion not being busy, and the portion not having been accessed recently. The storage device may include a hardware compression device that is used in connection with at least some of the compression algorithms. The performance may vary according to a ratio of an amount of compression achieved to processing cycles used by a processor to compress the portion of data, where the processor may be separate from the hardware compression device. The processor may perform storage device functions that are separate from data compression. The data may be compressed using out-of-band data compression that is independent of external accesses to the storage device. In-line data compression may be performed in connection with external accesses of data on the storage device and the in-line data compression may be independent of the out-of-band data compression.

According further to the system described herein, a non-transitory computer-readable medium contains software that compresses data of a storage device. The software includes executable code that selects a portion of data for data compression that is predicted to be unlikely to be accessed, executable code that selects a particular one of a plurality of data compression algorithms to apply to the portion according to a frequency value associated with each of the data compression algorithms, and executable code that adjusts the frequency value of the particular one of a plurality of data compression algorithms according to performance of the particular one of a plurality of data compression algorithms. The performance may vary according to a ratio of amount of compression achieved to processing cycles of a processor used to compress the portion of data. The processor may perform storage device functions that are separate from data compression. The portion of data may be selected from a plurality of logical devices used in connection with a single application that accesses the storage device. The portion may be selected based on the portion not having been previously compressed, the portion not being busy, and the portion not having been accessed recently. The storage device may include a hardware compression device that is used in connection with at least some of the compression algorithms. The performance may vary according to a ratio of an amount of compression achieved to processing cycles used by a processor to compress the portion of data, where the processor may be separate from the hardware compression device. The processor may perform storage device functions that are separate from data compression. The data may be compressed using out-of-band data compression that is independent of external accesses to the storage device. In-line data compression may be performed in connection with external accesses of data on the storage device and the in-line data compression may be independent of the out-of-band data compression.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 1:
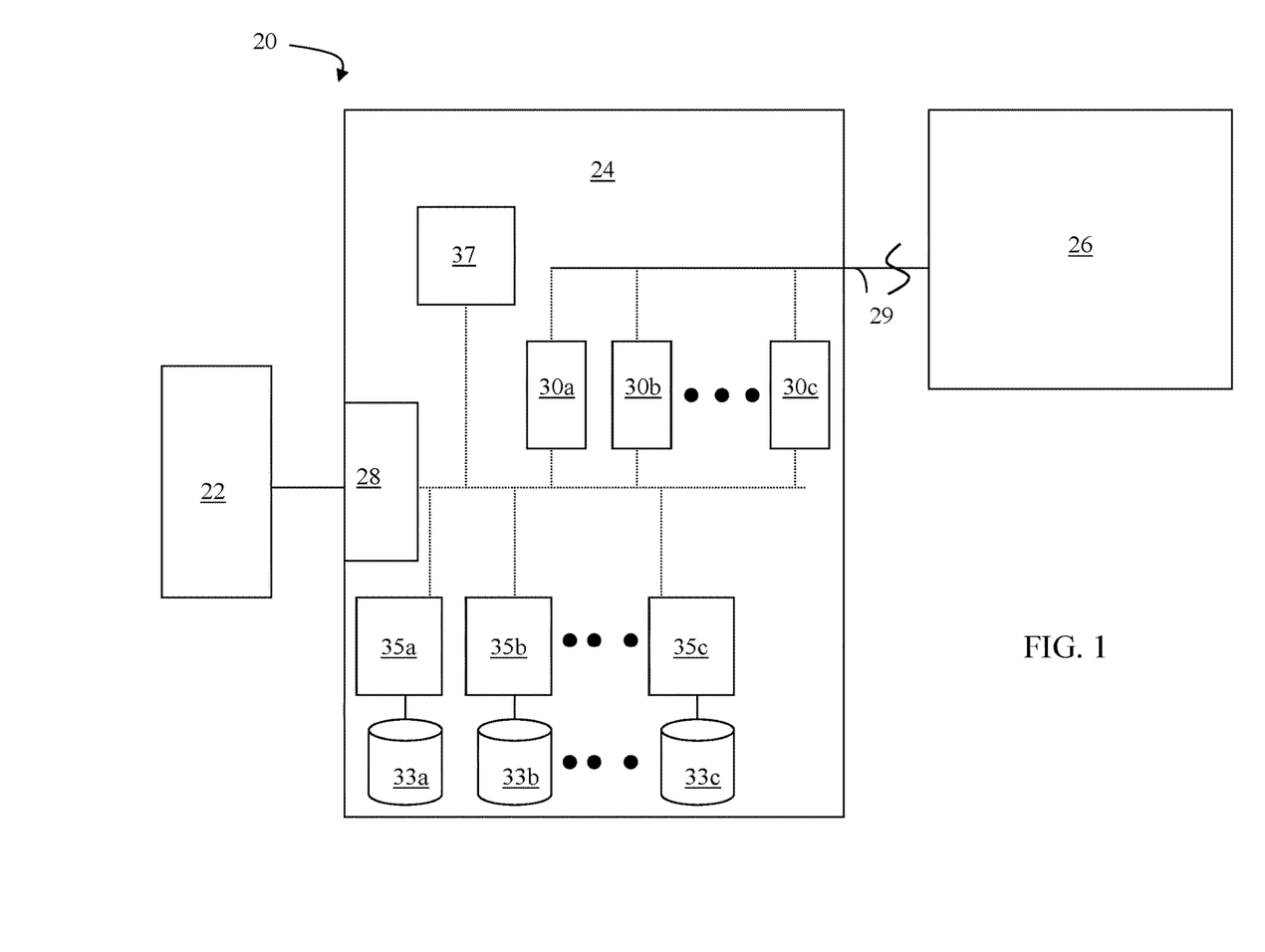
FIG. 1 is a schematic diagram of a storage system showing a relationship between a host and a storage device that may be used in connection with an embodiment of the system described herein.

Referring to FIG. 1, a schematic illustration of a storage system 20 shows a relationship between a host 22 and a storage device 24 that may be used in connection with embodiments of the system described herein. In an embodiment, the storage device 24 may be a Symmetrix storage system produced by EMC Corporation of Hopkinton, Mass.; however, the system described herein may operate with other appropriate types of storage devices, including other types of disk array storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 only shows one host 22 and one HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process, that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include a plurality of physical storage units 33a-33c, each containing a different portion of data stored on the storage device 24. The physical storage units 33a-33c may be disk drives and/or solid-state storage devices. The storage device 24 (and/or the remote storage device 26) may be provided as a stand-alone device coupled to the host 22 as shown in FIG. 1 or, alternatively, the storage device 24 (and/or the remote storage device 26) may be part of a storage area network (SAN) that includes a plurality of other storage devices as well as routers, network connections, etc. (not shown). The storage devices 24, 26 may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding one of a plurality of disk adapter units (DAs) 35a-35c that provide data to a corresponding one of the physical storage units 33a-33c and receives data from a corresponding one of the physical storage units 33a-33c. An internal data path exists between the DA's 35a-35c, the HA 28 and the RA's 30a-30c of the storage device 24. Note that, in other embodiments, it is possible for more than one physical storage unit to be serviced by a single DA and that it is possible for more than one DA to service one of the physical storage units 33a-33c. The storage device 24 may also include a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and/or the RA's 30a-30c, and may contain a cache for data fetched from one or more of the physical storage units 33a-33c.

The storage space in the storage device 24 that corresponds to the physical storage units 33a-33c may be subdivided into a plurality of volumes, also referred to as logical devices, logical storage units, or logical units. The logical units may or may not correspond to the physical storage space of the physical storage units 33a-33c. Thus, for example, the physical storage unit 33a may contain a plurality of logical units or, alternatively, a single logical unit could span both of the physical storage units 33a, 33b. Similarly, the storage space for the remote storage device 26 may be subdivided into a plurality of volumes or logical units, where each of the logical units may or may not correspond to one or more physical storage units of the remote storage device 26.

Figure 2:
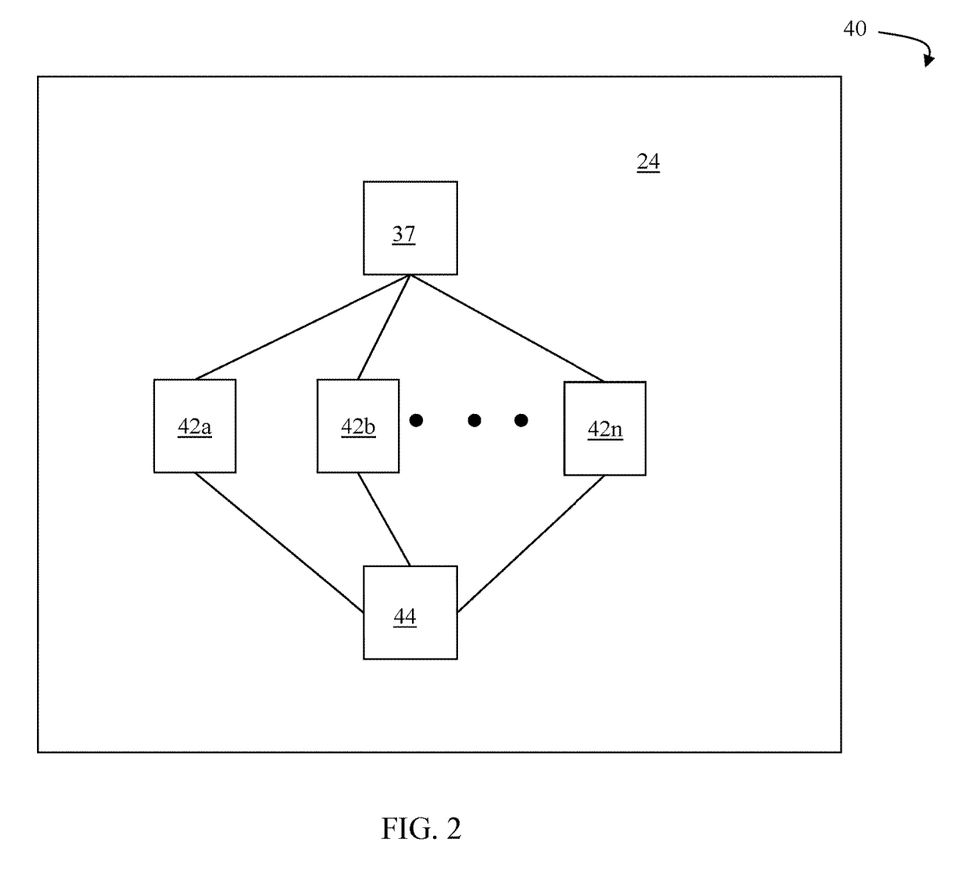
FIG. 2 is a schematic diagram illustrating an embodiment of the storage device where each of a plurality of directors are coupled to the memory.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 26. The CM 44 may be implemented using conventional MUX/router technology where a sending one of the directors 42a-42n provides an appropriate address to cause a message and/or data to be received by an intended receiving one of the directors 42a-42n. Some or all of the functionality of the CM 44 may be implemented using one or more of the directors 42a-42n so that, for example, the directors 42a-42n may be interconnected directly with the interconnection functionality being provided on each of the directors 42a-42n. In addition, a sending one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Figure 3:
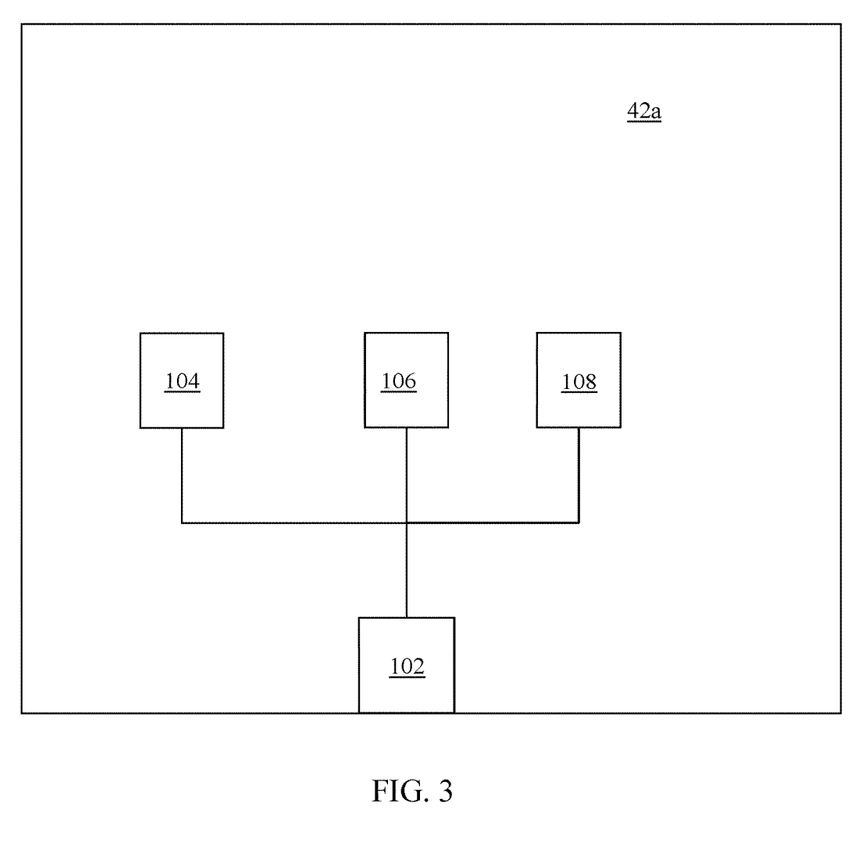
FIG. 3 is a schematic diagram illustrating a director board on a storage device according to an embodiment of the system described herein.

Referring to FIG. 3, the director 42a is shown in more detail as including a communications interface 102, a processor 104 and a memory 106. The communications interface 102 provides communication functionality for the director 42a to allow the director 42a to communicate with the memory 37, the optional communications module 44, and other ones of the directors 42b-42n. The communications interface 102 is coupled to the processor 104 and the memory 106, which are also coupled together, to allow data to be exchanged therebetween. The processor 104 may run software to provide conventional director board functionality (e.g., DA, HA, etc.) as discussed elsewhere herein.

The director 42a also includes a specialized data compression device 108 that provides hardware data compression using a single chip or a collection of chips. In an embodiment herein, the data compression device 108 may be implemented using the XR9240 device made by MaxLinear, Inc. of Carlsbad, Calif., although other appropriate devices may be used instead. Data that is provided to the data compression device 108 is compressed (reduced in size) using algorithms/processing provided by the data compression device 108. The data compression device 108 may be programmable to use different hardware compression algorithms. Note that any data compression that is provided by the data compression device 108 rather than the processor 104 reduces the load on the processor 104. Thus, generally, it is desirable to use the data compression device 108 to provide hardware data compression whenever possible. However, as discussed in more detail elsewhere herein, in some cases, it may be advantageous to use software data compression algorithms that run on the processor 104.

The system described herein uses the data compression device 108 and/or data compression software running on the processor 104 to compress data stored on the physical storage units 33a-33c. In an embodiment herein, compressing the data is performed out-of-band (OOB) meaning that data is read, compressed, and written back independently of any production I/O operations, such as I/O operations performed in response to data access requests from the host 22. That is, accessing data on the physical storage units 33a-33c in connection with the OOB compression is performed without regard to and independent of any external accesses of the storage device 24. In some embodiments, the OOB compression may be performed at the same time as independent in-line compression is also being performed. In-line compression causes data accessed on the storage device 24 to be compressed when the data is written back to the storage device 24. Thus, for example, in-line compression can cause data being written to the storage device 24 from the host 22 to be compressed in connection with the write operation.

The system performs OOB compression using a plurality of different compression algorithms, some of which may be implemented using software that runs on the processor 104, some of which may be implemented using the data compression device 108, and some of which may use a combination of both. If a particular algorithm performs well (described in more detail elsewhere herein), then the frequency of the particular algorithm (the number of times the algorithm is used in a given time period) is increased. Similarly, if a particular algorithm performs poorly (described in more detail elsewhere herein), then the frequency of the particular algorithm is decreased.

Figure 4:
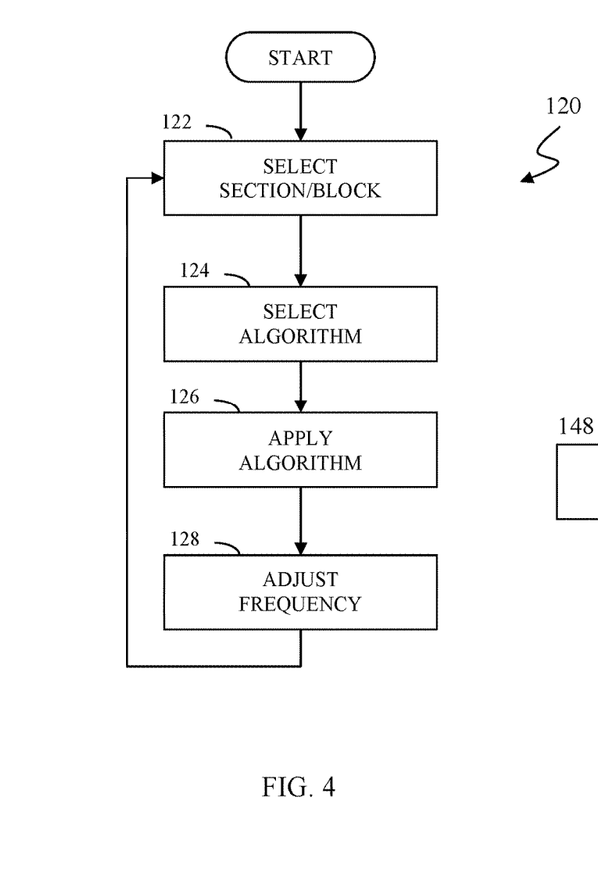
FIG. 4 is a flow diagram illustrating performing out-of-band data compression an embodiment of the system described herein.

Referring to FIG. 4, a flow diagram 120 illustrates processing performed in connection with running an instance of OOB compression for data stored at the storage device 24. In an embodiment herein, OOB compression is provided separately for each subset of data in the storage device 24 corresponding to a group of logical units used for a particular application. That is, OOB compression is separately provided for each group of logical units used for each application. For example, if there are three applications: APP1, APP2, and APP3, then a first instance of OOB compression is run for the group of logical units used for APP1, a second instance of OOB compression, separate and independent from the first instance, is run for the group of logical units used for APP2, and a third instance of OOB compression, separate and independent from the first and second instances, is run for the group of logical units used for APP3. Of course, other divisions are possible, such as running a separate instance of OOB compression for each logical unit or, alternatively, a running a single instance of OOB compression for all of the data in the storage device 24. However, providing OOB compression separately for each subset of data in the storage device 24 corresponding to a group of logical units used for a particular application is advantageous since data for a particular application is generally homogenous and thus responds relatively consistently to the same compression algorithm(s).

Processing for the flow diagram 120 begins at a first step 122 where a particular block/section of data is chosen for compression. Determining which block/section is chosen at the step 122 is described in more detail elsewhere herein. Following the step 122 is a step 124 where a compression algorithm is selected for applying to the block/section chosen at the step 122. Choosing a compression algorithm at the step 124 is described in more detail elsewhere herein. Following the step 124 is a step 126 where the algorithm chosen at the step 124 is applied to the block/section chosen at the step 122. Following the step 126 is a step 128 where the frequency of the algorithm (the number of times the algorithm is used in a given time period) is adjusted based on the effectiveness of the algorithm. In an embodiment herein, the effectiveness may be determined by a ratio of the amount of compression achieved to a number of processing cycles (time) needed to perform the compression. Adjusting the frequency at the step 128 is discussed in more detail elsewhere herein. Following the step 128, control transfers back to the step 122, discussed above, for another iteration.

Figure 5:
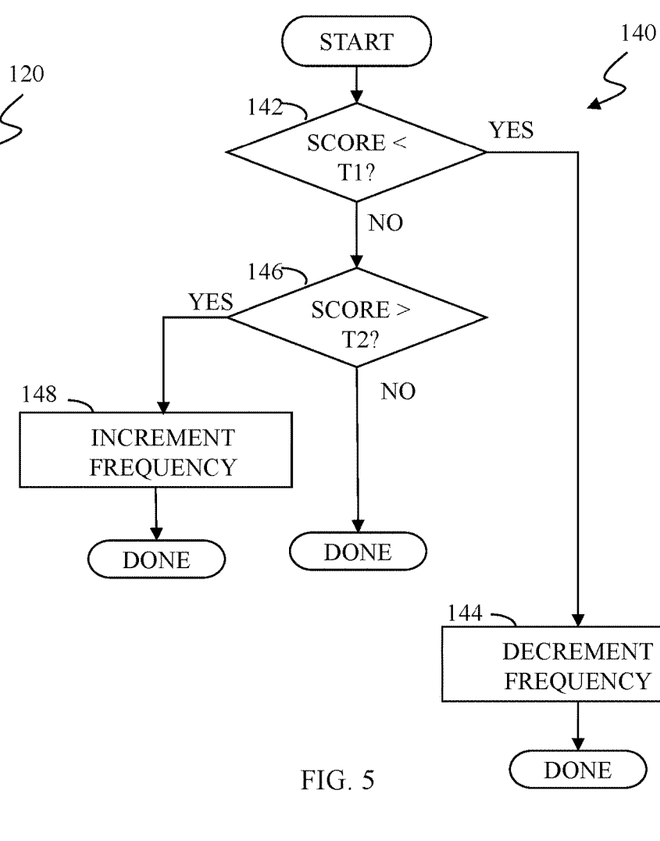
FIG. 5 is a flow diagram illustrating changing running frequency of data compression algorithms according to an embodiment of the system described herein.

Referring to FIG. 5, a flow diagram 140 illustrates in more detail processing performed at the step 128, described above, where frequency of a particular algorithm is adjusted based on compression effectiveness of the particular algorithm. The frequency adjustment determines how often in a given amount of time the particular algorithm will be run. Any appropriate mechanism may be used to adjust the frequency of algorithms and to choose an algorithm for a particular iteration at the step 124. In an embodiment herein, an algorithm is chosen at the step 124 using a random or pseudo-random number and ranges of the number are mapped to different algorithms. Thus, for example, range1 to range2 could map to algorithm 1, rage 2 to range 3 could map to algorithm 2, etc. Accordingly, increasing or decreasing the frequency of an algorithm could correspond to increasing or decreasing the corresponding range. Of course, other mechanisms could be used to schedule and adjust the frequency of data compression algorithms, including conventional mechanisms that include round robin selection at the step 124.

Processing for the flow diagram 140 begins at the test step 142 where it is determined if a value corresponding to determined effectiveness of the compression algorithm is less than a first predetermined threshold. In an embodiment herein, the effectiveness of a compression algorithm is determined according to a ratio of an amount of compression achieved (compression ratio) to a number of processing cycles (time) needed to perform the compression. Of course, other mechanisms to determine effectiveness may be used instead. If it is determined at the test step 142 that the effectiveness is less than the first predetermined threshold, then control transfers from the test step 142 to a step 144, where the frequency of the algorithm (discussed elsewhere herein) is decreased. Following the step 144, processing is complete. In some embodiments, it is possible for a particular data compression algorithm to perform so poorly that the frequency adjustment for the particular data compression algorithm is adjusted to cause the particular algorithm to not run. On such a case, a mechanism may be provided to cause the algorithm to be tested at a later time to determine if performance improves. For example, it is possible to provide a mechanism that causes every data compression algorithm to run N times per week irrespective of whether the frequency value is such that some of the algorithms would not otherwise run at all.

If it is determined at the test step 142 that the effectiveness is not less than the first predetermined threshold, then control transfers from the test step 142 to a test step 146 where it is determined if the effectiveness is greater than a second predetermined threshold, which is greater than the first predetermined threshold. If so, then control transfers from the test step 146 to a step 148 where the frequency of the algorithm is increased, as described elsewhere herein. Following the step 148, processing is complete. Note that, if it is determined at the step 148 that the effectiveness is not greater than the second predetermined threshold, then processing is complete and the frequency of the particular algorithm does not change.

As discussed elsewhere herein, it is possible for some of the data compression algorithms to use the data compression device 108 to run at least a portion of a compression algorithm. Since the data compression device 108 is dedicated to performing compression, use thereof does not impact performance of the director 42a. In contrast, the processor 104 provides a significant amount of other functionality (e.g., HA, DA, etc.) for the director 42a. Accordingly, in the system described herein, the effectiveness is determined by dividing by a number of processing cycles of the processor 104 that is used without regard to processing cycles used by the data compression device 108. Thus, it is advantageous for the OOB compression to use the data compression device 108 whenever possible.

Although it is possible to perform OOB compression on any data for an application, it is more advantageous to compress data that is not accessed frequently (or accessed at all) since the instances of reading and decompress the data will be minimized. Note also that data that is expected to be modified in the short term is not a good candidate for OOB compression since any newly written data will no longer be compressed. In an embodiment herein, the system predicts that a particular data block/section is unlikely to be accessed in the future based on past access patterns. This is described below.

Figure 6:
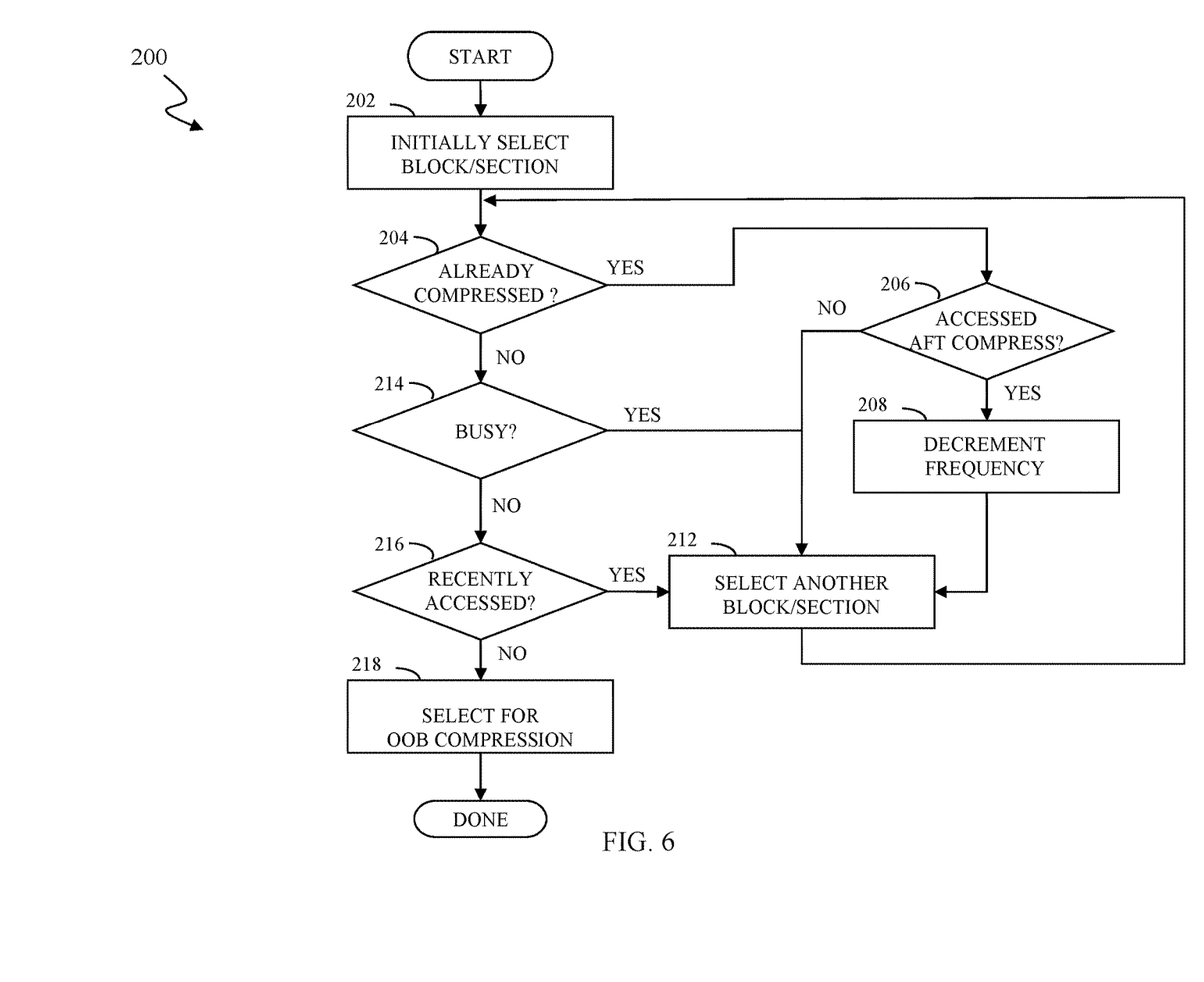
FIG. 6 is a flow diagram illustrating choosing a section/block of data for out of band data compression according to an embodiment of the system described herein.

Referring to FIG. 6, a flow diagram 200 illustrates in more detail processing performed at the step 122 of the flow diagram 120, discussed above, where a particular data block/section is selected for OOB compression. Processing begins at a first step 202 where a specific block/section is initially selected for possible OOB compression. Following the step 202 is a test step 204 where it is determined if the block/section that was initially selected at the step 202 has already been compressed (e.g., compressed in a previous iteration or by a different, independent, compression mechanism, such as in-line compression). If it is determined at the step 204 that the block/section selected at the step 202 has already been compressed, then control transfers from the step 204 to a test step 206 where it is determined if the block/section has been accessed after being compressed. In an embodiment herein, if a block/section had been previously compressed, but was accessed nonetheless (i.e., read after being compressed), then it is desirable to decrease the frequency of the algorithm used to compress the block/section. If it is determined at the step 206 that the block/section had been accessed after being compressed, then control transfers from the step 206 to a step 208 where the frequency of the algorithm is decremented, as described in more detail elsewhere herein. Following the step 208 is a step 212 where a different block/section is initially selected for possible OOB compression. Following the step 212, control transfers back to the step 204, discussed above, for another iteration. Note that the step 212 is also reached from the step 206 if it is determined at the step 206 that the block/section had not been accessed after being compressed.

If it is determined at the step 204 that the block/section selected at the step 202 has not already been compressed, then control transfers from the step 204 to a test step 214 where it is determined if the block/section is busy, meaning that the block/section is subject to frequent I/O operations. In an embodiment herein, different blocks/sections are scored based on a number of I/O operations per unit time and a percentage (e.g., 20%) of the blocks/sections that have the greatest amount of I/O operations are deemed busy. If it is determined at the test step 214 that the block/section selected at the step 202 is busy, then control transfers from the test step 214 to the step 212, discussed above, where a different block/section is initially selected for possible OOB compression. Otherwise, control transfers from the step 214 to a test step 216 where it is determined if the block/section has been active recently. A block/section is determined to have been active recently if it contains relatively new data (e.g., data added to the system in a previous six month period) or if the block/section was recently read (e.g., data read in a previous six month period). Note that reading compressed data incurs an overhead since reading compressed data requires use of a decompression algorithm and may introduce latency. If it is determined at the test step 216 that the block/section selected at the step 202 has been recently accessed, then control transfers from the test step 216 to the step 212, discussed above, where a different block/section is initially selected for possible OOB compression. Otherwise, control transfers from the step 216 to a step 218 where the block/section is selected for OOB compression. Following the step 218, processing is complete.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of compressing data of a storage device, comprising:
    selecting a portion of data for data compression based on past access patterns of the portion of data;
    selecting a particular one of a plurality of data compression algorithms to apply to the portion according to a frequency value associated with each of the data compression algorithms; and
    adjusting the frequency value of the particular one of a plurality of data compression algorithms according to performance of the particular one of a plurality of data compression algorithms, wherein the frequency value is decreased in response to the portion of data being accessed after being compressed.

2. The method, according to claim 1, wherein the performance varies according to a ratio of amount of compression achieved to processing cycles of a processor used to compress the portion of data.

3. The method, according to claim 2, wherein the processor performs storage device functions that are separate from data compression.

4. The method, according to claim 1, wherein the portion of data is selected from a plurality of logical devices used in connection with a single application that accesses the storage device.

5. The method, according to claim 1, wherein the portion is selected based on the portion not having been previously compressed, the portion not being busy, and the portion not having been accessed recently.

6. The method, according to claim 1, wherein the storage device includes a hardware compression device that is used in connection with at least some of the compression algorithms.

7. The method, according to claim 6, wherein the performance varies according to a ratio of an amount of compression achieved to processing cycles used by a processor to compress the portion of data, wherein the processor is separate from the hardware compression device.

8. The method, according to claim 7, wherein the processor performs storage device functions that are separate from data compression.

9. The method, according to claim 1, wherein the data is compressed using out-of-band data compression that is independent of external accesses to the storage device.

10. The method, according to claim 9, wherein in-line data compression is performed in connection with external accesses of data on the storage device and wherein the in-line data compression is independent of the out-of-band data compression.

11. A non-transitory computer-readable medium that contains software that compresses data of a storage device, the software comprising:
    executable code that selects a portion of data for data compression based on past access patterns of the portion of data;
    executable code that selects a particular one of a plurality of data compression algorithms to apply to the portion according to a frequency value associated with each of the data compression algorithms; and
    executable code that adjusts the frequency value of the particular one of a plurality of data compression algorithms according to performance of the particular one of a plurality of data compression algorithms, wherein the frequency value is decreased in response to the portion of data being accessed after being compressed.

12. The non-transitory computer-readable medium, according to claim 11, wherein the performance varies according to a ratio of amount of compression achieved to processing cycles of a processor used to compress the portion of data.

13. The non-transitory computer-readable medium, according to claim 12, wherein the processor performs storage device functions that are separate from data compression.

14. The non-transitory computer-readable medium, according to claim 11, wherein the portion of data is selected from a plurality of logical devices used in connection with a single application that accesses the storage device.

15. The non-transitory computer-readable medium, according to claim 11, wherein the portion is selected based on the portion not having been previously compressed, the portion not being busy, and the portion not having been accessed recently.

16. The non-transitory computer-readable medium, according to claim 11, wherein the storage device includes a hardware compression device that is used in connection with at least some of the compression algorithms.

17. The non-transitory computer-readable medium, according to claim 16, wherein the performance varies according to a ratio of an amount of compression achieved to processing cycles used by a processor to compress the portion of data, wherein the processor is separate from the hardware compression device.

18. The non-transitory computer-readable medium, according to claim 17, wherein the processor performs storage device functions that are separate from data compression.

19. The non-transitory computer-readable medium, according to claim 11, wherein the data is compressed using out-of-band data compression that is independent of external accesses to the storage device.

20. The non-transitory computer-readable medium, according to claim 19, wherein in-line data compression is performed in connection with external accesses of data on the storage device and wherein the in-line data compression is independent of the out-of-band data compression.

* * * * *